United States Patent
Johnson et al.

(10) Patent No.: US 7,338,547 B2
(45) Date of Patent: Mar. 4, 2008

(54) EMI-ABSORBING AIR FILTER

(75) Inventors: Richard Norman Johnson, Encinitas, CA (US); Phillip van Haaster, Corona, CA (US)

(73) Assignee: Laird Technologies, Inc., Delaware Water Gap, PA (US)

( * ) Notice: Subject to any disclaimer, the term of this patent is extended or adjusted under 35 U.S.C. 154(b) by 214 days.

(21) Appl. No.: 10/530,110

(22) PCT Filed: Oct. 2, 2003

(86) PCT No.: PCT/US03/31119

§ 371 (c)(1),
(2), (4) Date: Oct. 28, 2005

(87) PCT Pub. No.: WO2004/032580

PCT Pub. Date: Apr. 15, 2004

(65) Prior Publication Data

US 2006/0150599 A1    Jul. 13, 2006

(51) Int. Cl.
*B01D 39/14* (2006.01)
*B01D 59/50* (2006.01)
*B01D 24/00* (2006.01)
*B05D 3/04* (2006.01)
*B32B 3/26* (2006.01)
*B32B 5/14* (2006.01)
*B32B 5/16* (2006.01)
*H01B 1/06* (2006.01)
*H05K 9/00* (2006.01)

(52) U.S. Cl. ............... 55/524; 55/385.7; 55/528; 55/385.1; 55/385.2; 55/385.3; 427/304; 428/304.4; 428/307.7; 428/331; 252/511; 174/382

(58) Field of Classification Search ............... 252/511; 428/307.7, 331, 304.4; 174/35 GC, 382; 55/385.7, 528, 385.1, 385.2, 385.3, 524; 427/304
See application file for complete search history.

(56) References Cited

U.S. PATENT DOCUMENTS

| | | | | |
|---|---|---|---|---|
| 5,151,222 A | * | 9/1992 | Ruffoni | 252/511 |
| 5,506,047 A | * | 4/1996 | Hedrick et al. | 428/307.7 |
| 5,633,081 A | * | 5/1997 | Clough et al. | 428/331 |
| 6,395,402 B1 | * | 5/2002 | Lambert et al. | 428/550 |
| 6,870,092 B2 | * | 3/2005 | Lambert et al. | 174/355 |
| 7,135,643 B2 | * | 11/2006 | van Haaster et al. | 174/382 |
| 2005/0132885 A1 | * | 6/2005 | Zarganis et al. | 95/285 |

* cited by examiner

*Primary Examiner*—Walter D. Griffin
*Assistant Examiner*—Amber Miller-Harris
(74) *Attorney, Agent, or Firm*—Harness, Dickey & Pierce, P.L.C.

(57) ABSTRACT

Electro-magnetic-energy absorbing materials are used to treat air filters, such as those used in association with electronic equipment thereby suppressing the transmission of electromagnetic interference (EMI) therethrough. Disclosed are processes and materials for applying EMI-absorbing materials to air filters thereby improving EMI-shielding effectiveness in an economically efficient manner. In one embodiment, an absorptive solution is prepared using an absorptive material and a binding agent. A heavy coating of absorbing solution applied to an air filter substrate, for example by dipping or spraying. Excess absorbing material is subsequently removed and the absorbing material cured, such that the passage of air through the filter remains substantially unimpeded. The resulting absorptive air filter is then optionally treated with a flame retardant to meet a predetermined safety standard.

38 Claims, 10 Drawing Sheets

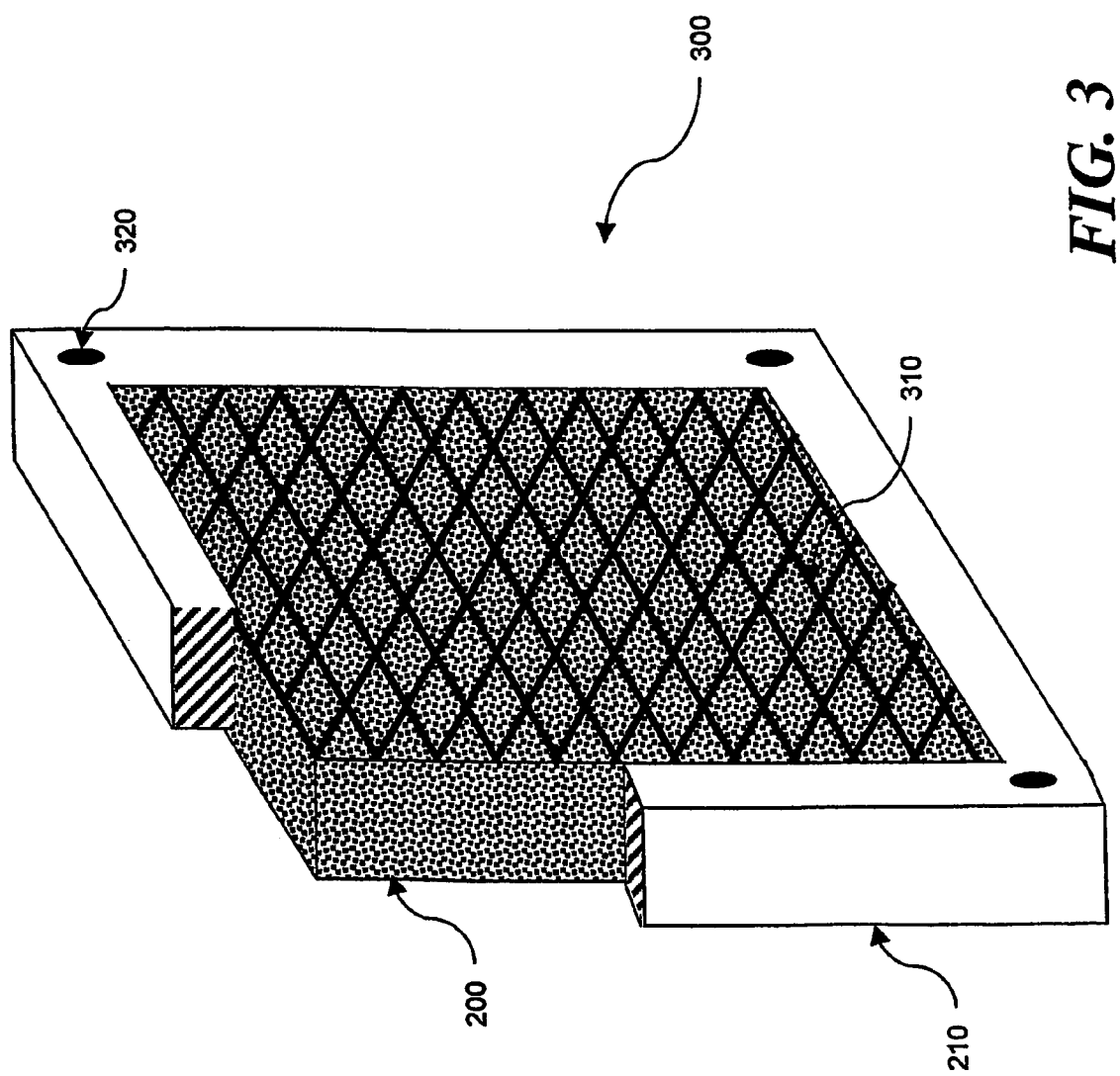

EMI-ABSORBING AIR FILTER

BACKGROUND OF THE INVENTION

1. Field of the Invention

The present invention relates generally to the attenuation of electromagnetic energy and, more specifically, to porous materials incorporating electromagnetic-energy-attenuating materials.

2. Description of the Prior Art

As used herein, the term EMI should be considered to refer generally to both electromagnetic interference and radio frequency interference (RFI) emissions, and the term "electromagnetic" should be considered to refer generally to electromagnetic and radio frequency.

During normal operation, electronic equipment typically generates undesirable electromagnetic energy that can interfere with the operation of proximately located electronic equipment due to EMI transmission by radiation and conduction. The electromagnetic energy can exist over a wide range of wavelengths and frequencies. To minimize problems associated with EMI, sources of undesirable electromagnetic energy can be shielded and electrically grounded to reduce emissions into the surrounding environment. Alternatively, or additionally, susceptors of EMI can be similarly shielded and electrically grounded to protect them from EMI within the surrounding environment. Accordingly, shielding is designed to prevent both ingress and egress of electromagnetic energy relative to a barrier, a housing, or other enclosure in which the electronic equipment is disposed.

In the abstract, an ideal EMI shield would consist of a completely enclosed housing constructed of an infinitely conductive-material without apertures, seams, gaps, or vents. Practical applications, however, result in an enclosure constructed of a finitely conducting material having some apertures. Apertures may be unintentional, such as those incident to a method of construction (for example, gaps or seams, for example between adjacent access panels and around doors, or between component housings and circuit boards), or intentional, such as vents to accommodate air flow for cooling. Special methods of manufacture may be employed to improve the shielding effectiveness of unintentional apertures, for example, by welding or soldering seams, or by milling a cavity within a contiguous member of shielding material, thereby eliminating unintentional apertures.

As mentioned, cooling vents are typically required because electronic equipment typically generates thermal energy (that is, heat) that must usually be removed from the equipment to ensure continued, long-term, and proper operation. Shielding of apertures relating to cooling vents are necessarily more challenging, because the apertures themselves cannot be eliminated as cooling air must be allowed to pass through to facilitate heat transfer.

Prior-art solutions are available that provide some level of EMI shielding across a cooling aperture. For example, a cooling aperture may be covered by an electrically conducting plate having field of smaller apertures (that is, a two-dimensional array) spanning the cooling aperture. Other solutions include an electrically conductive screen, while still other solutions include a two-dimensional array of waveguide apertures (for example, a "honeycomb"). Each of these solutions provides preferential attenuation to lower-frequency EMI having a frequency below some "cutoff" frequency generally determined by the largest dimension of each individual aperture. Moreover, these solutions are complicated as they rely on a positive electrical bonding of the plate or screen to the equipment housing that must be maintained over the life of the equipment. Maintaining such an electrical bond can be particularly challenging in high-vibration and/or corrosive environments.

As mentioned, shielding effectiveness of such conventional methods and materials decreases with increasing frequency. Thus, effective shielding of EMI in many of today's electronic applications is becoming more challenging, as current trends continue to increase operational frequencies. For example, microprocessor clocking rates used within currently available consumer electronics, such as personal computers, are operating at thousands of megahertz. Later generation devices are expected to operate at even greater frequencies.

There exist other methods for providing EMI shielding across cooling apertures. See, for example, U.S. Pat. No. 5,151,222 issued to Ruffoni, the disclosure of which is herein incorporated by reference in its entirety. Ruffoni discloses the use of an open-cell reticulated polyurethane foam impregnated with a conductive ink. The method disclosed in Ruffoni applies the conductive ink to the surface of the foam, resulting in a variation, or gradient, in conductivity from the coated surface of the foam to its interior. Purportedly, the conductive ink offers improved attenuation performance at higher frequencies. Unfortunately, however, due to the resulting gradient, a heavier application of conductive ink is required at the foam surface in order to provide a desired overall attenuation characteristic. Such an application results in a pressure drop from blocked pores due to a heavier application of conductive ink necessary to meet increasing attenuation requirements. As such, the foam shown in Ruffoni is not suitable for use as an air filter.

SUMMARY OF THE INVENTION

In general, the present invention relates to an electromagnetic-interference- (EMI-) absorbing air filter, such as a planar, porous substrate (for example, a polyurethane foam sheet) treated with an electromagnetic-interference- (EMI-) absorbing material. The EMI-absorbing material absorbs a portion of the EMI incident upon the treated air filter, thereby reducing transmission of EMI therethrough over a range of operational frequencies. The absorbing material may remove a portion of the EMI from the environment through power dissipation resulting from loss mechanisms. These loss mechanisms include polarization losses in a dielectric material and conductive, or ohmic, losses in a conductive material having a finite conductivity.

Accordingly, in a first aspect; the invention relates to an air filter having EMI-absorbing characteristics. The filter includes a porous substrate (for example, an open-cell reticulated polyurethane foam) and an EMI-absorbing material applied to the porous substrate. In one embodiment, the EMI-absorbing material includes particles of an electrical-energy absorber, such as carbon, and a binding agent, such as an epoxy, or elastomer. In another embodiment, the EMI-absorbing air filter undergoes multiple applications of EMI-absorbing material during manufacture.

In another embodiment, the EMI-absorbing air filter also includes a fire retardant. In yet another embodiment, the EMI-absorbing air filter includes an electrically conductive layer. The conductive layer can be configured, for example, as a screen or as a waveguide-below-cutoff array (that is, a honeycomb).

In another aspect, the invention relates to a process for fabricating an air filter having EMI-absorptive characteristics. The process includes the steps of providing a porous substrate having a first side and a second side and applying an EMI-absorptive material to the porous substrate in a manner allowing the electrically-absorptive material to be distributed substantially constantly or evenly throughout the depth of the porous substrate. In one embodiment, the step of applying the EMI-absorbing material further includes the sub-steps of providing an EMI-absorbing solution including an electrical absorber and a binding agent, immersing the porous substrate into the EMI-absorbing solution causing the solution to penetrate the porous substrate, extracting the porous substrate from the solution, removing any excess solution, and curing the EMI-absorbing material. In another embodiment, the above-described procedural steps are repeated one or more times to apply additional EMI-absorbing material to meet a desired attenuation performance requirement.

In another embodiment, the step of applying the EMI-absorbing material includes providing an electrically absorptive solution including an electrical absorber and a binding agent; spraying the electrically absorptive solution onto a first side of the porous substrate; removing excess electrically absorptive solution from the sprayed, porous substrate, thereby leaving the EMI-absorbing material substantially evenly distributed through the porous substrate; and curing the electrically absorptive material.

In another embodiment, the process of applying a layer of EMI-absorbing material further includes the step of forcing air through the porous substrate, thereby ensuring that pores remain substantially unblocked. In yet another embodiment, the process further includes the step of applying a fire-retardant layer.

BRIEF DESCRIPTION OF THE DRAWINGS

The invention is pointed out with particularity in the appended claims. The advantages of the invention may be better understood by referring to the following description, taken in conjunction with the accompanying drawings, in which:

FIG. 3 is a schematic diagram depicting a perspective view of an alternative embodiment of an EMI-absorbing air filter combined with a conductive layer;

DETAILED DESCRIPTION OF THE PREFERRED EMBODIMENTS

Materials having electromagnetic-energy-absorbing properties can be used to suppress the transmission of EMI over a broad range of frequencies. Such EMI-absorbing materials can provide substantial electromagnetic shielding effectiveness, for example, up to about 5 dB or more at EMI frequencies occurring up to about 100,000 megahertz.

According to the present invention, EMI-absorbing materials can be formed in a solution capable of being applied to a suitable porous substrate. Generally, the resulting absorptive solution includes an absorbing material and a binding agent that can be applied to new, custom air filters, or to commercially available non-EMI air filters.

Figure 1:
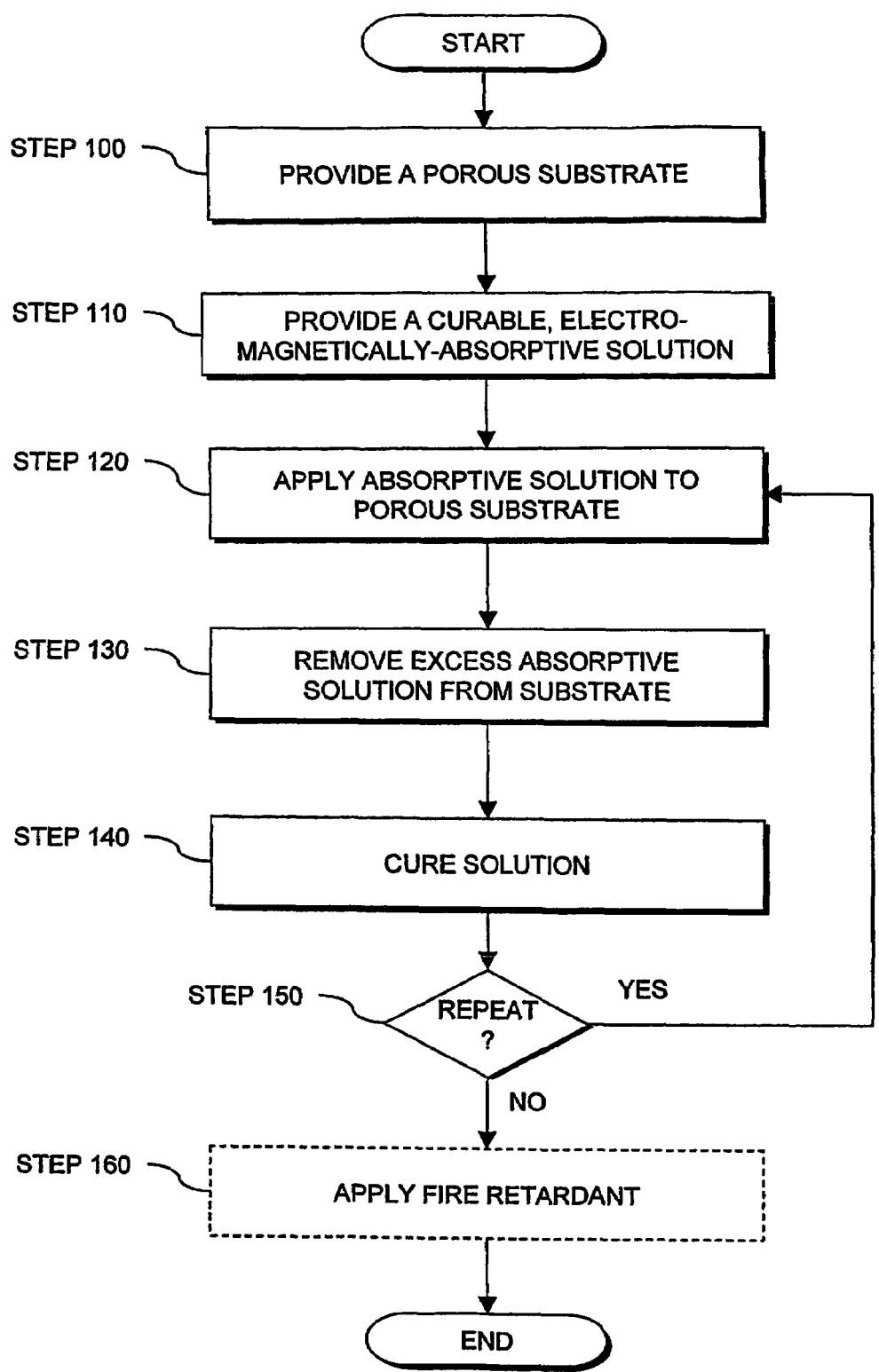
FIG. 1 is a flow chart diagram depicting procedural steps of an embodiment of a process for fabricating an EMI-absorbing air filter.

Referring to FIG. 1, procedural steps are illustrated for one embodiment of a process applying an EMI-absorbing material to an air filter. In brief overview, a porous substrate is provided (step 100) along with a curable, EMI-absorbing solution (step 110). Next, the EMI-absorbing solution is applied to the porous substrate (step 120) followed by the removal of any excess solution (step 130). The EMI-absorbing solution deposited in the porous substrate is then cured (step 140). If a greater EMI-absorbing performance is required, steps 120 through 140 can be repeated one or more times (step 150), thereby applying additional EMI-absorbing material. In some embodiments, a fire retardant is optionally applied (step 160, shown in phantom).

In more detail, the porous substrate is generally selected as having properties desirable for an air filter, namely, a high dust arrestance and a low pressure drop (or, conversely, a high air permeability). One measure of the porosity of a given sample is pores per linear inch (ppi). Numerous porous substrates are readily available, including fiberglass mats, non-woven polyester webs, and various foams. In one embodiment, the porous substrate provided in step 100 is an open-cell foam, such as a reticulated polyurethane foam. Common applications of foam substrates used to filter air flow in electronic equipment applications can have 3 ppi to more than 20 ppi. Foams, such as synthetic plastic foams, also provide the desirable characteristics of being compliant and resilient, offering the capability of "giving" and returning to their original shape. In general, however, the porous substrate can be a commercially available, standard air filter.

In general, the EMI-absorbing solution provided in step 110 includes one or more EMI-absorbing materials and a binding agent. In some embodiments, the EMI-absorbing solution also includes highly conductive material, such as copper or aluminum. EMI-absorbing materials are selected to suppress the transmission of electromagnetic energy, for example, by converting the electromagnetic energy into another form of energy, such as thermal energy. EMI-absorbing materials may exhibit dielectric or magnetic properties, or a combination of both. Some examples of EMI-absorbing materials include carbon, carbon fibers, alumina ($Al_2O_3$), sapphire, silica ($SiO_2$), titanium dioxide ($TiO_2$), ferrite, iron, iron silicide, graphite, and composites with different combinations of iron, nickel, and copper. The aforementioned EMI-absorbing materials are generally solids over anticipated ambient operating temperatures and pressures. As such, the EMI-absorbing materials are generally prepared as particles suitable for suspension within the binding agent.

Various U.S. patents describe lossy materials and their uses. See, for example, U.S. Pat. No. 4,408,255 issued to Adkins, U.S. Pat. No. 5,689,275 issued to Moore et al., U.S. Pat. No. 5,617,095 issued to Kim et al., and U.S. Pat. No. 5,428,506 issued to Brown et al., the disclosures of which are herein incorporated by reference in their entirety. Some manufacturers of lossy materials are R&F Products of San Marcos, Calif.; ARC Technical Resources, Inc. of San Jose, Calif.; Tokin America, Inc. of Union City, Calif.; Intermark-USA, Inc. of Long Island City, N.Y.; TDK of Mount Prospect, Ill.; and Capcon of Inwood, N.Y.

The binding agent adheres the EMI-absorbing material to a substrate, such as the porous substrate. In some embodiments, a binding agent is selected that cures with a resilient consistency. In one embodiment, for example, the binding agent is an elastomer, such as a resin binder. In other embodiments, the binding agent is a rubber, such as a natural latex rubber (for example, Stuart 1584), a synthetic rubber, such as styrene-butadiene rubber (SBR), or a proprietary binder. Binders having a resilient consistency adhere the EMI-absorbing material to the porous substrate, while allowing the porous substrate to remain flexible or supple. In other embodiments, however, a binding agent is selected that cures with a less resilient or even rigid consistency. One example of a rigidly curing binding agent is an epoxy resin.

The application step (step 120) applies the EMI-absorbing solution to the porous substrate. In one embodiment, the porous substrate is dipped in a bath of the EMI-absorbing solution. In another embodiment, the EMI-absorbing solution is applied to the porous substrate as a paint, for example, by either a brush, roller, or spray applicator. In yet other embodiments, the EMI-absorbing solution is applied to the porous substrate as an ink, for example, by one or more applicators bearing the EMI-absorbing solution. Generally, the EMI-absorbing solution is applied liberally to the porous substrate, such that excess solution is thereafter removed.

The removal of excess EMI-absorbing solution (step 130) primarily assures that the pores of the substrate treated with an application of the EMI-absorbing solution remain substantially open, thereby ensuring that the substrate remains functional as an air filter. In one embodiment, removal of the excess EMI-absorbing solution is accomplished by squeezing or otherwise compressing the treated substrate. For example, the treated substrate can be drawn through a roller, such as one formed between two opposing cylindrical rollers, or a single cylindrical roller opposing a rigid planar surface or plate. In other embodiments, removal of the excess EMI-absorbing solution is accomplished by forcing or drawing air through the treated porous substrate. The air can be forced through the treated substrate by applying a positive pressure at a first surface of the substrate. Alternatively, air can be drawn through the treated substrate by drawing a vacuum on one side of the substrate. The removal of excess EMI-absorbing solution can be accomplished by a combination of the aforementioned methods.

The curing step (step 140) allows the applied finish of the EMI-absorbing material and binding agent to set. In some embodiments, the finished substrate can be air-cured at ambient room temperature. In other embodiments, the finished substrate can be cured at elevated temperatures, for example in an oven.

In some embodiments, a fire retardant, such as a phosphate or antimony trioxide, is optionally applied to the substrate (step 160) to meet stringent flammability standards. One such flammability standard is the UL94V0 vertical flame test, described in detail in Underwriters Laboratories Standard 94, entitled "Tests for Flammability of Plastic Materials for Parts in Devices and Appliances," 5$^{th}$ Edition, 1996, the disclosure of which is incorporated herein by reference in its entirety. In some embodiments, a fire retardant is applied in the same manner as described above for the EMI-absorbing solution (steps 100 through 140). In other embodiments, additional treatments, such as fungicides, are similarly applied.

Figure 2B:
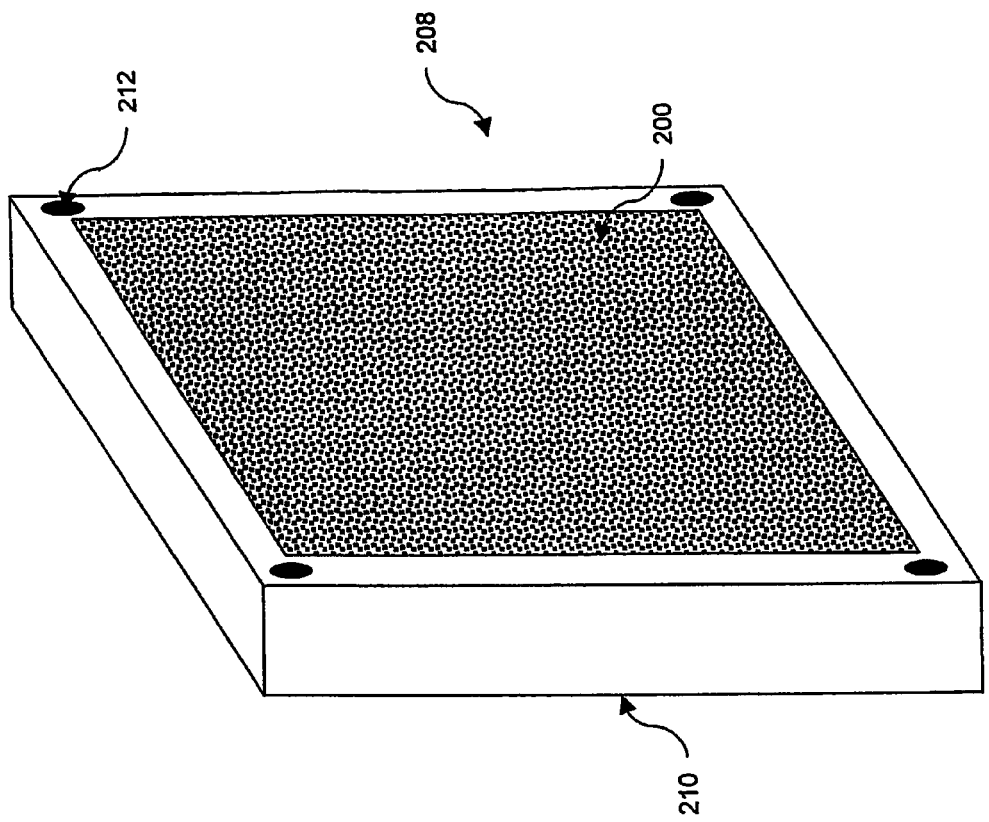
FIGS. 2A and 2B are schematic diagrams depicting perspective views of alternative embodiments of a free-standing EMI-absorbing air filter, and a frame-mounted EMI-absorbing air filter, respectively.
Figure 2A:
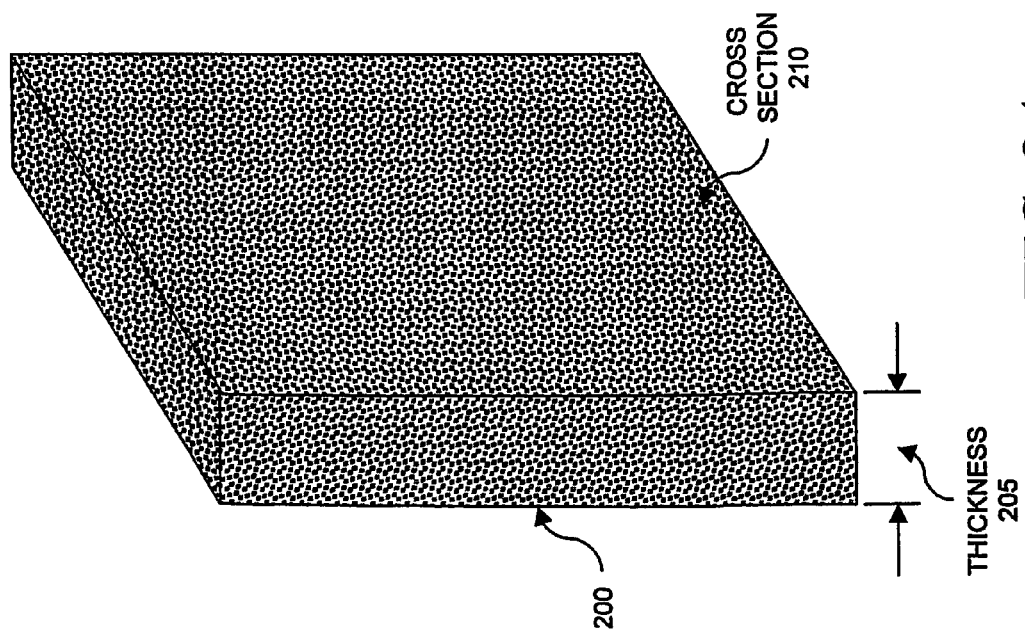

Referring now to FIG. 2A, a perspective view is illustrated depicting a free-standing, planar, EMI-absorbing air filter 200. In general, the planar filter 200 defines an arbitrarily shaped cross section 210 (shown as a rectangle) having a predetermined thickness 205. There are no particular constraints on the thickness 205, however common values range from about 0.1 inch to 0.5 inch or more. The size of the cross section 210 is generally determined by the application, typically being larger than the air-vent opening to which it is affixed. FIG. 2B illustrates a perspective view of a framed configuration 208 including a planar, electro-magnetic-interference-absorbing air filter 200 configured within a frame 210. The frame 210 provides rigidity and can include structure for fastening the framed filter 208 to an equipment housing (not shown). For example, the frame 210 can include mounting holes 212 through which fasteners are inserted to secure the framed filter 208 to the equipment housing.

As discussed above, the EMI-absorbing material is generally most effective at higher frequencies (for example, above 1 GHz). In some applications, however, particularly where the cross section of the air filter is relatively large (for example, greater than about 10 cm), the EMI-absorbing filter 200 can be combined advantageously with a low frequency EMI-mitigating means. Illustrated in FIG. 3 is a perspective view depicting a combination EMI/air filter. The combination filter 300 includes an EMI-absorbing air filter 200, as described above, and an electrically conducting layer 310. The conducting layer 310 is an electrical conductor, such as aluminum or copper, with an array of apertures through which air can flow. The conducting layer 310 can be formed from a rigid plate or from a screen. In some embodiments, the conducting layer includes a conductive coating applied to the filter 200. The conductive coating generally consists of a highly conductive material, such as copper, aluminum, or gold. The conductive coating can be prepared as a paint or ink and applied to the filter 200 by dipping, brushing or spraying. Alternatively, the conductive coating can be prepared as particles and applied to the filter 200 in a sputtering process.

The combination air filter 300 can be optionally mounted within a frame 210 (illustrated in partial cutaway). The frame 210 offers rigidity and also assists in forming a positive electrical ground from the conducting layer 300 to the equipment housing. The frame 210 itself can be conducting, thereby providing electrical bonding between the conducting layer 310 and an equipment housing. Alternatively, the frame can be non-conducting, forming an electrical bond by compressing the conducting layer 310 against the chassis. Generally, the frame 210 includes a fastening means 320, such as a mechanical fastener (for example, a screw, a rivet, and the like).

Figure 4:
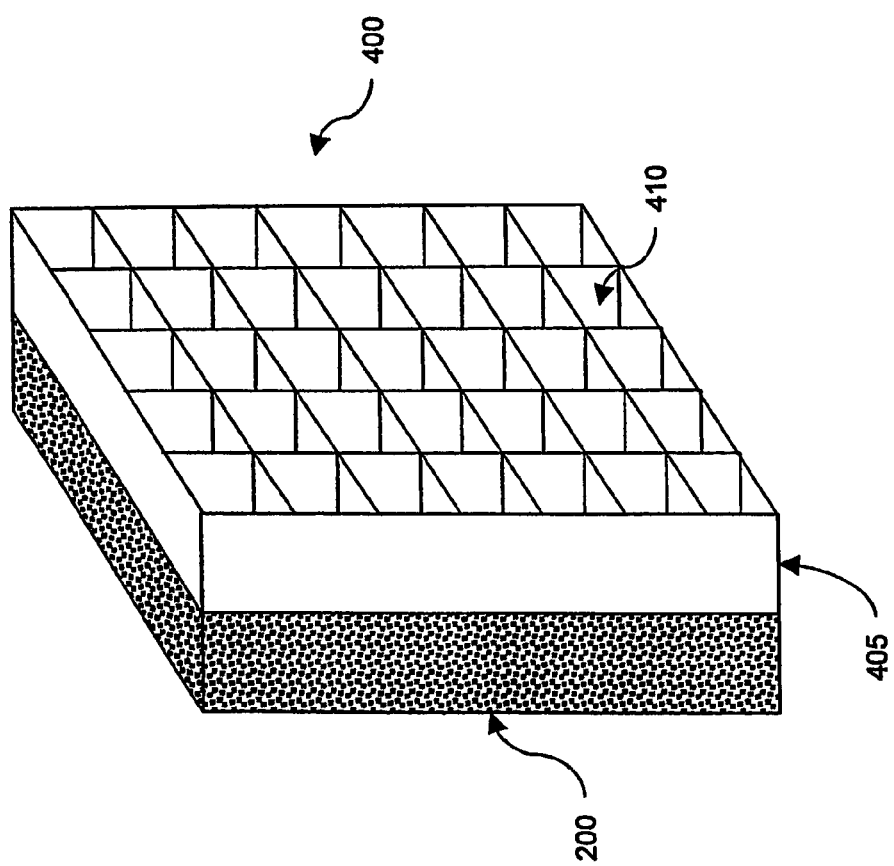
FIG. 4 is a schematic diagram depicting a perspective view of an alternative embodiment of an EMI-absorbing air filter combined with a waveguide-below-cutoff filter.

Referring to FIG. 4, an alternative embodiment of a combination EMI filter 400 is shown. A perspective view of the combination EMI filter 400 is illustrated depicting an EMI absorbing air filter 200 combined with a waveguide-below-cutoff layer 405. The waveguide-below-cutoff layer 405 is formed from an electrical conductor, such as aluminum or copper, and includes an array of apertures 410 (that is, waveguides) distributed across the filter's surface area. Each aperture 410 can be constructed with arbitrary shapes, such as rectangular (shown), circular, and hexagonal. Each aperture 410 preferentially attenuates electromagnetic radiation below a predetermined "cutoff" frequency controllable by the dimensions of the aperture 410. The apertures 410 of the waveguide-below-cutoff layer 405 allow air to flow to the EMI-absorbing air filter layer 200. As the EMI-absorbing layer 200 attenuates higher frequencies, the resulting combination EMI filter 400 attenuates a broader range of frequencies than either layer 200,405 would otherwise attenuate alone.

Figure 5B:
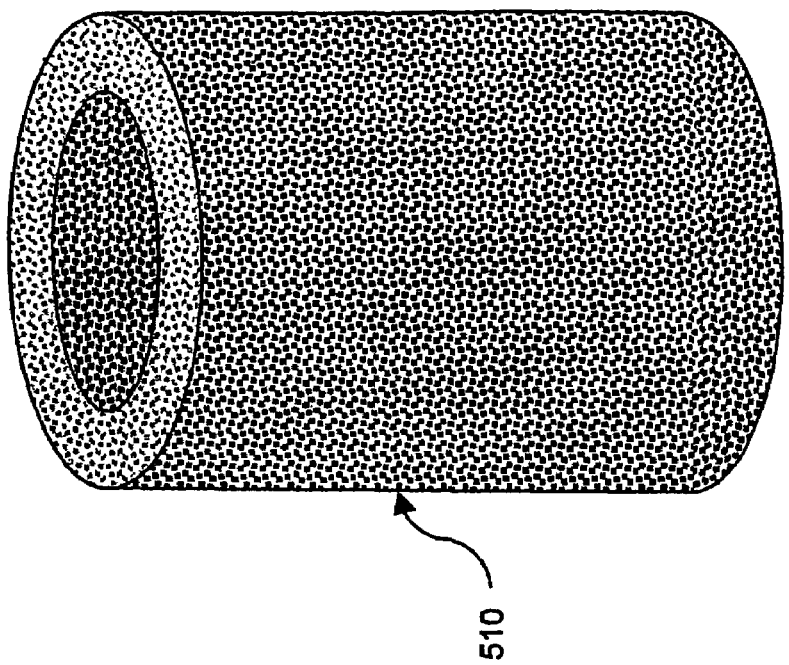
FIGS. 5A and 5B are schematic diagrams depicting perspective views of exemplary alternative embodiments of an EMI-absorbing air filter formed in non-planar configurations.
Figure 5A:
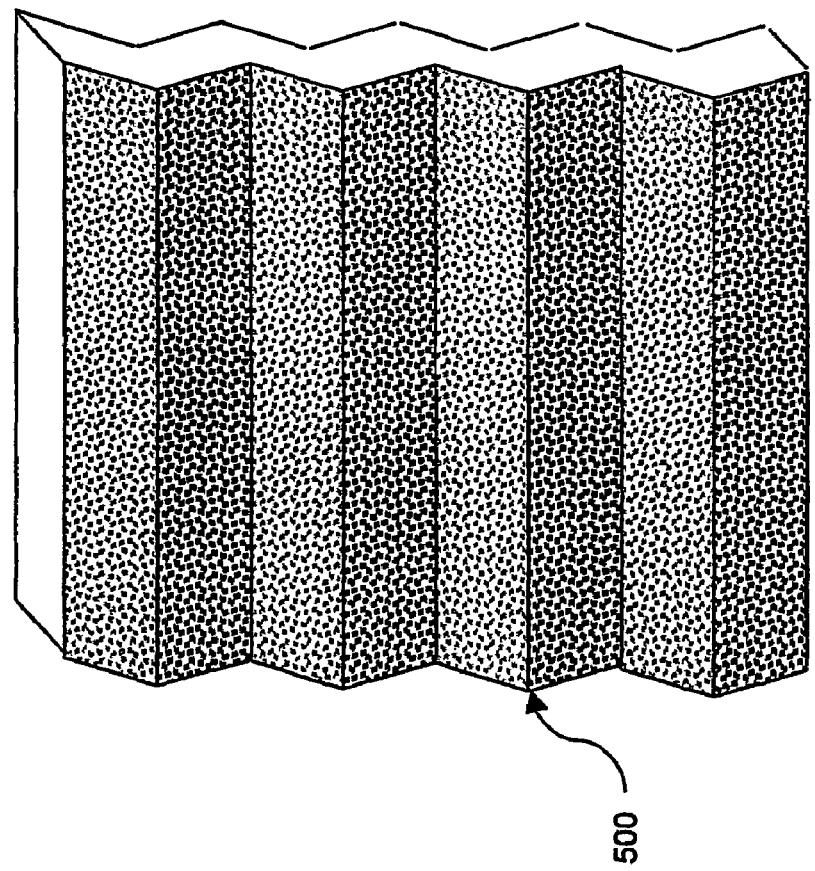

In general, the EMI-absorbing air filters can be fashioned in any desired configuration. FIGS. 5A and 5B illustrate exemplary non-planar applications depicting embodiments in which the porous substrate upon which EMI-absorbing solution is applied is pleated 500, and tubular 510.

Figure 6:
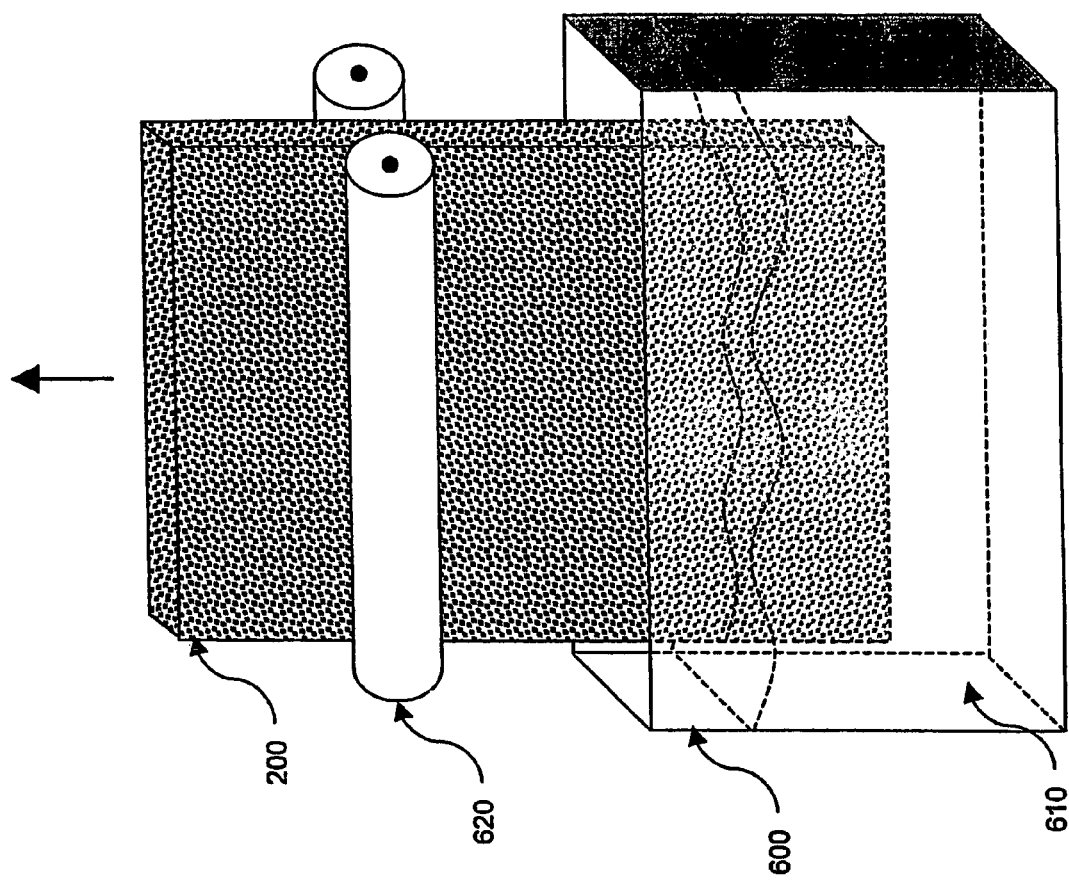
FIG. 6 is a schematic diagram depicting a manufacturing process capable of yielding the EMI-absorbing air filter depicted in FIGS. 1 through 5.

FIG. 6 illustrates one embodiment of a "dipping" manufacturing process for forming the EMI-absorbing air filter. A container 600, such as a trough, holds an EMI-absorbing solution 610. A porous substrate 200 is then immersed into the solution 610 thereby allowing the solution 610 to completely cover and penetrate the porous substrate 200. The substrate 200 is then drawn from the solution 610 through a wringer 620. The wringer 620, shown as a dual cylindrical roller assembly compresses the substrate 200 by a predetermined amount to remove excess solution 610 and to ensure that the solution 610 is forced into the interior of the substrate 200.

Figure 7:
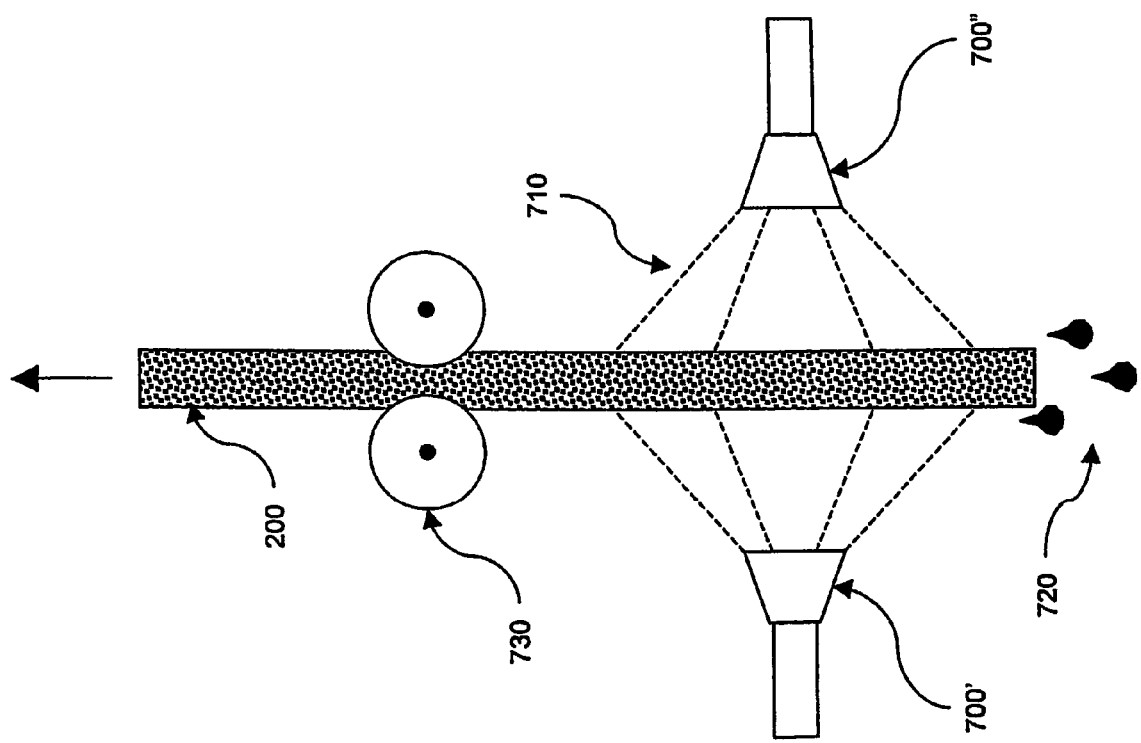
FIG. 7 is a schematic diagram depicting an alternative manufacturing process also capable of yielding the EMI-absorbing air filter depicted in FIGS. 1 through 5.

FIG. 7 illustrates an alternative embodiment of a "spraying" manufacturing process for forming the EMI-absorbing air filter 200. One or more sprayers 700', 700" (generally 700), spray the EMI-absorbing solution 710 onto the porous substrate 200. Generally, any type of spray applicator 700 known to those skilled in the art can be employed (for example, pneumatic, mechanical, aerosol, etc.). The sprayer(s) 700 apply a liberal coating of the EMI-absorbing solution 710 to completely cover and penetrate the porous substrate 200. The substrate 200 is next drawn through a wringing device, such as a dual cylindrical roller assembly 730. The wringing device 730 compresses the substrate 200 by a predetermined amount to remove excess solution 720 and again to ensure that the solution 710 is forced into the interior of the substrate 200.

Figure 8:
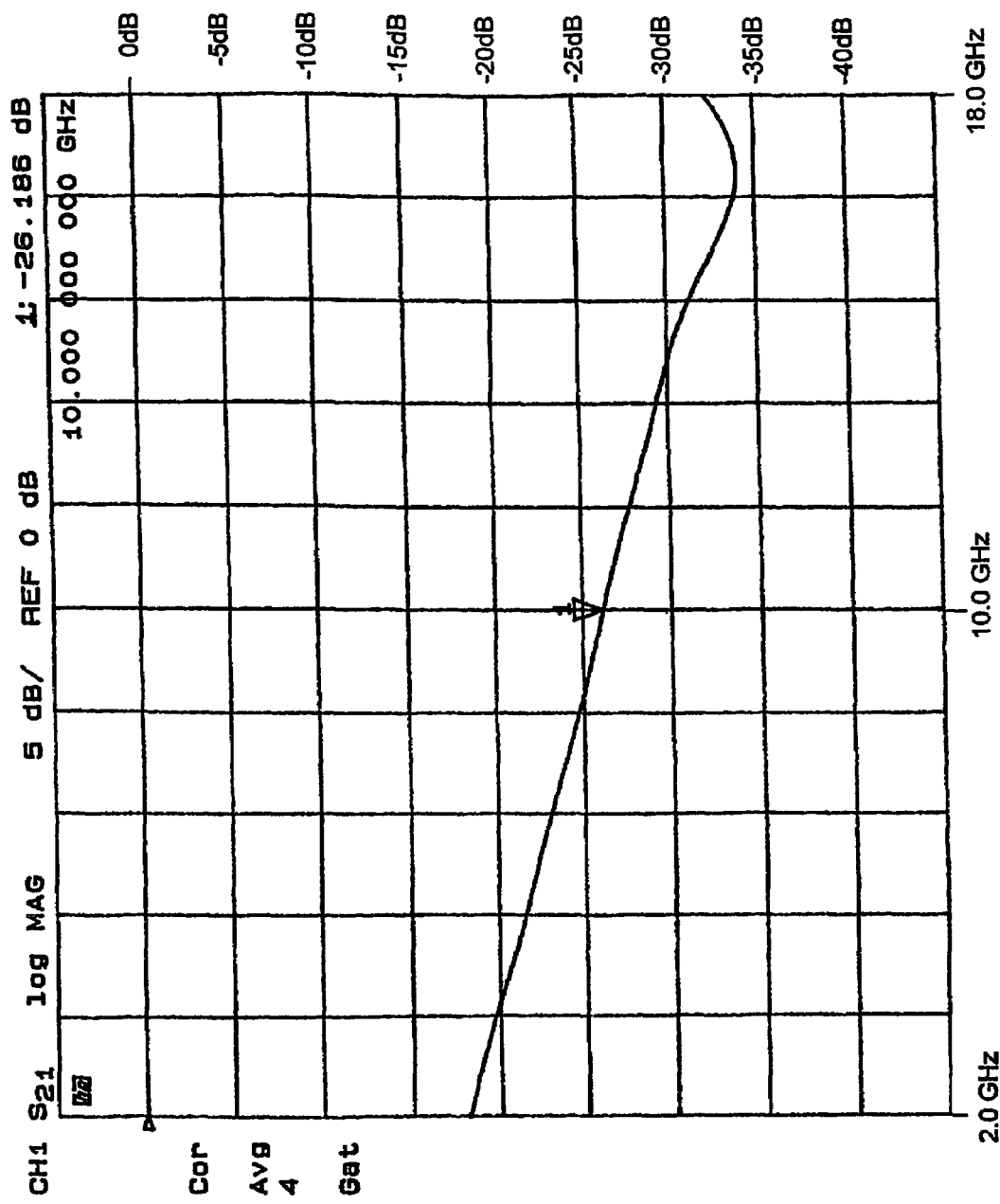
FIG. 8 is a chart depicting test measurement results of the attenuation versus frequency for an exemplary sample of an EMI-absorbing air filter.

FIG. 8 illustrates test measurement results relating to the EMI performance of a sample EMI-absorbing air filter. The EMI-absorbing air filter test sample was formed by applying a carbon-based absorber in an elastomer binder to an open-cell reticulated polyurethane foam planar substrate. The sample substrate was formed as a 0.25-inch thick sheet having approximately 20 ppi. The sample was treated with a double carbon coating and flame retardant as described above. The electromagnetic transmission loss was measured across the filter over the frequency range from about 2.0 GHz to about 18.0 GHz. The resulting sample demonstrated a measured attenuation of more than 20 decibels (dB) above a frequency of about 4 GHz.

As the EMI-absorbing air filter must also function as an air filter, it is important that the filter allow sufficient air flow after being treated with the EMI-absorbing material and, optionally, with other coatings, such as a flame-retardant coating. One measure of the air filter's air flow performance is pressure drop versus air flow. A discussion of an exemplary test setup for measuring the air flow performance, as well as measured air flow test results, are provided herein as an appendix and incorporated herein. Generally, any reduction in air flow resulting from the application of the one or more coatings is controlled to reduce air flow by no more than a predetermined amount (for example, a difference in pressure drop for the same air flow of not more than 10%).

Having shown exemplary and preferred embodiments, one skilled in the art will realize that many variations are possible within the scope and spirit of the claimed invention. It is therefore the intention to limit the invention only by the scope of the claims, including all variants and equivalents.

APPENDIX

Airflow Test Report

Objective:

This test compares the airflow characteristics of a non-shielding air filter material to absorber-treated air filter materials.

Part Description:

A "baseline" air-filter material has been selected to represent an exemplary electronic-equipment dirt and dust filter. The baseline filter consists of an open-cell polyurethane foam having approximately 20 ppi and a sample thickness of 0.25 inch.

A first sample reference "T-15" represents an EMI-absorbing air filter having a double coating of carbon and a flame-retardant treatment. The T-15 sample has been formed using an open-cell polyurethane foam, approximately 15 ppi and a sample thickness of 0.25 inch.

A second sample reference "R-20" represents an EMI-absorbing air filter having a double coating of carbon and a flame-retardant treatment. The R-20 sample has also been formed using an open-cell polyurethane foam, having approximately 20 ppi, and again having a sample thickness of 0.25 inch.

Figure 9:
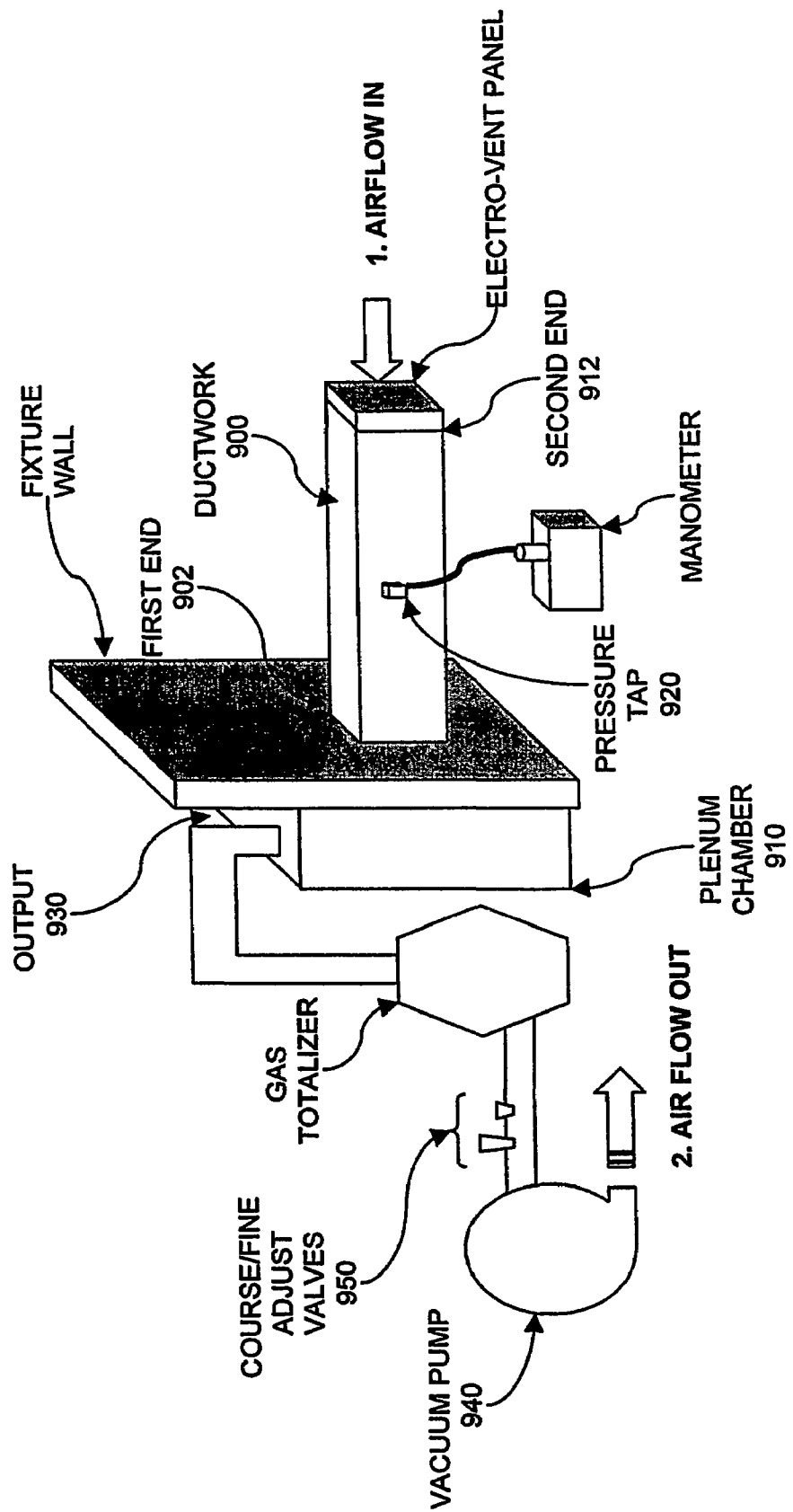
FIG. 9 is a schematic diagram depicting an exemplary test setup enabling the measurement of air flow through a material, such as the EMI-absorbing air filter.

Test Method:

Airflow testing was conducted in accordance with air-permeability standard, ASTM D737, described in the American Society for Testing and Materials Annual Book of ASTM Standards. The test set-up, a representation of which is shown in FIG. 9, consisted of a 6 inch'6 inch sheet metal duct 900 with metal flanges at each end (not shown). A first end of the duct 902 was sealed against an opening in a plenum chamber 910 using suitable fixtures and sealant. The EMI-absorbing air filter sample under test was attached to a second end of the duct 912 and sealed in a manner preventing leakage from the sides. A pressure tap 920 was made on the duct at a distance of 18 inches from its second open end 912. A plenum chamber outlet 930 was connected to the suction side of a centrifugal blower (vacuum pump) 940 via a series of valves 950 and an airflow-metering device. Calibrated instrumentation was used in measuring the test parameters.

Figure 10:
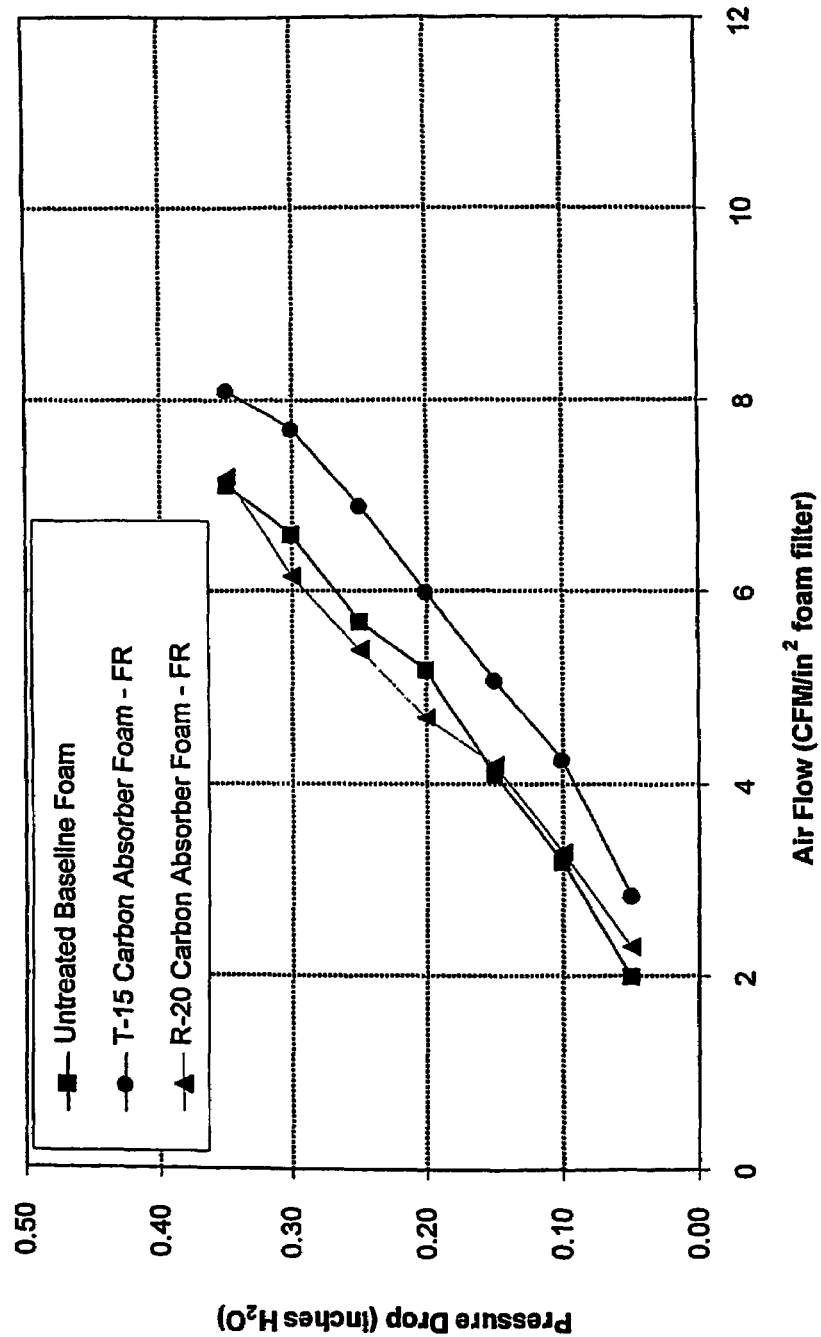
FIG. 10 is a chart depicting test measurement results of the pressure drop versus air flow measured using the test setup illustrated in FIG. 9 for two exemplary samples of EMI-absorbing air filters in accordance with the invention compared to an untreated air filter.

Test Results:

FIG. 10 illustrates the resulting test data in graphical form comparing the performance of the absorber-treated foams (T-15, R-20) to the untreated baseline foam filter. The graph includes a vertical axis representing "static pressure" (measured in inches of water) and a horizontal axis representing "airflow" (measured in cubic-feet-per-minute per square inch of vent panel, $CFM/in^2$). Test results for the untreated baseline foam and two samples of treated foam are illustrated on the graph. The test results demonstrate that the static pressure increases with increasing airflow for all three samples. This gradual increase in static pressure is due to the inherent resistance to airflow that the test panel offers to the air stream.

Conclusions:

The results indicate that there is virtually no difference between the untreated baseline filter foam and the R-20 absorber filter foam. As expected, the T-15 absorber filter foam exhibits greater air flow than the baseline and R-20 samples. This is due to its cell structure being more open with 15 ppi as compared to 20 ppi for the other two test samples. The data indicates that the airflow characteristics of the R-20 sample should be similar to the baseline samples, while also providing EMI absorption.

What is claimed is:

1. An air filter having electromagnetic-energy absorptive characteristics, the filter comprising:
    a porous substrate; and
    an electrically absorptive material applied to the porous substrate and forced into the interior of the substrate, such that the electrically absorptive material penetrates substantially the entire porous substrate and is distributed substantially uniformly throughout the porous substrate.

2. The air filter of claim 1, wherein the electrically absorptive material comprises an electrical absorber and a binding agent.

3. The air filter of claim 2, wherein the electrical absorber is selected from the group consisting of carbon, carbon particles, carbon fibers, alumina, sapphire, silica, titanium dioxide, ferrite, iron, iron silicide, graphite, and composites of iron, nickel and copper.

4. The air filter of claim 2, wherein the binding agent is selected from the group consisting of an elastomer, a rubber and an epoxy.

5. The air filter of claim 2, wherein the electrically absorptive material further comprises a highly conductive material.

6. The air filter of claim 5, wherein the highly conductive material is selected from the group consisting of copper and aluminum.

7. The air filter of claim 1, further comprising a fire-retardant layer.

8. The air filter of claim 7, wherein the fire-retardant layer comprises a fire retardant selected from the group consisting of phosphates and antimony trioxide.

9. The air filter of claim 7, wherein the fire-retardant-treated porous substrate passes a self-extinguishing vertical burn requirement in accordance with Underwriters Laboratories Standard 94.

10. The air filter of claim 1, wherein the porous substrate comprises an open-cell reticulated polyurethane foam.

11. The air filter of claim 10, wherein the foam comprises at least about 10 pores per linear inch.

12. The air filter of claim 1, wherein the porous substrate comprises a fiberglass mat.

13. The air filter of claim 1, wherein the porous substrate comprises a non-woven polyester web.

14. The air filter of claim 1, further comprising an electrically conductive layer.

15. The air filter of claim 14, wherein said electrically conductive layer is an electrical conductor having an array of apertures through which air can flow.

16. The air filter of claim 14, wherein said electrically conductive layer is a conductive coating applied thereto.

17. The air filter of claim 14, wherein the electrically conductive layer comprises a honeycomb.

18. The air filter of claim 1, further comprising a frame fixedly attached to the porous substrate, wherein the frame provides physical support for the porous substrate.

19. The air filter of claim 1, wherein the porous substrate comprises a sheet having a thickness less than about 0.5 inches.

20. The air filter of claim 1, wherein the porous substrate provides at least 20 dB of attenuation to electromagnetic energy substantially occurring at frequencies at least between about 4 GHz and 18 GHz.

21. A method for producing an air filter having electromagnetic-energy-absorptive characteristics comprising the steps of:
    applying an electrically absorptive solution to a porous substrate having a first side and a second side, and forcing the electrically absorptive solution into the interior of the substrate, such that, the electrically absorptive solution penetrates substantially the entire porous substrate and is distributed substantially uniformly throughout the porous substrate.

22. The method of claim 21, wherein the applying step comprises the sub-steps of:
    immersing the porous substrate into the electrically absorptive solution comprising an electrical absorber and a binding agent, causing the electrically absorptive solution to penetrate the porous substrate;
    extracting the immersed porous substrate from the electrically absorptive solution;
    removing excess electrically absorptive solution from the extracted porous substrate, thereby leaving a substantially uniform distribution of electrically absorptive solution through the porous substrate; and
    curing the electrically absorptive solution.

23. The method of claim 22, wherein the electrical absorber is selected from the group consisting of carbon, carbon particles, carbon fibers, alumina, sapphire, silica, titanium dioxide, ferrite, iron, iron silicide, graphite, and composites of iron, nickel and copper.

24. The method of claim 22, wherein the binding agent is selected from the group consisting of an elastomer, a rubber and an epoxy.

25. The method of claim 22, further comprising the step of forcing air through the porous material during at least one of prior to curing and curing, thereby ensuring that pores remain substantially unblocked.

26. The method of claim 25, wherein the step of forcing air through the porous material comprises drawing a vacuum.

27. The method of claim 21, wherein the step of removing excess electrically absorptive solution comprises squeezing the extracted porous substrate.

28. The method of claim 21, wherein the step of applying an electrically absorptive solution is repeated.

29. The method of claim 21, further comprising the step of applying a fire-retardant layer.

30. The method of claim 29, wherein the fire-retardant layer comprises a fire retardant selected from the group consisting of phosphates and antimony trioxide.

31. The method of claim 21, wherein the applying step comprises:
    spraying the electrically absorptive solution comprising an electrical absorber and a binding agent onto the first side of the porous substrate;

removing excess electrically absorptive solution from the sprayed, porous substrate, thereby leaving a substantially uniform distribution of electrically absorptive solution through the porous substrate; and curing the electrically absorptive solution.

32. The method of claim 31, further comprising the step of spraying the electrically absorptive solution onto the second side of the porous substrate.

33. The method of claim 21, wherein the air-flow characteristics of the porous substrate are substantially equivalent before and after the application of the electrically absorptive solution.

34. The method of claim 21, wherein a reduction in air-flow capacity of the porous substrate when compared before and after the application of the electrically absorptive solution is preferably less than 25%.

35. The method of claim 21, wherein a reduction in air-flow capacity of the porous substrate when compared before and after the application of the electrically absorptive solution is more preferably less than 15%.

36. The method of claim 21, wherein a reduction in air-flow capacity of the porous substrate when compared before and after the application of the electrically absorptive solution is even more preferably less than 10%.

37. The method of claim 21, wherein the electrically absorptive solution comprises an electrical absorber in particulate form suspended in a binding agent.

38. The air filter of claim 1, wherein the electrically absorptive material comprises an electrical absorber in particulate form suspended in a binding agent.

* * * * *